United States Patent [19]

Suetomi

[11] Patent Number: 5,740,143
[45] Date of Patent: Apr. 14, 1998

[54] DISC REPRODUCING APPARATUS

[75] Inventor: Tatsuto Suetomi, Kanagawa, Japan

[73] Assignee: Sony Corporation, Tokyo, Japan

[21] Appl. No.: 710,054

[22] Filed: Sep. 10, 1996

Related U.S. Application Data

[63] Continuation of Ser. No. 618,078, Mar. 18, 1996, abandoned, which is a continuation of Ser. No. 261,346, Jun. 16, 1994, abandoned.

[30] Foreign Application Priority Data

Jun. 18, 1993 [JP] Japan ..................... 5-147648

[51] Int. Cl.$^6$ ........................................ H04N 5/76
[52] U.S. Cl. ........................................ 369/60
[58] Field of Search ................... 369/32, 54, 58, 369/59, 60, 48, 124, 44.32, 47

[56] References Cited

U.S. PATENT DOCUMENTS

| | | | |
|---|---|---|---|
| 4,495,609 | 1/1985 | Russell | 369/60 |
| 4,984,103 | 1/1991 | Nigam | 360/74.1 |
| 5,140,571 | 8/1992 | Nishida et al. | 369/44.11 |
| 5,212,678 | 5/1993 | Roth et al. | 369/60 |
| 5,224,089 | 6/1993 | Matsumura et al. | 369/124 |
| 5,289,440 | 2/1994 | Bakx | 369/32 |
| 5,291,467 | 3/1994 | Ishiwata et al. | 369/54 |
| 5,317,553 | 5/1994 | Ohga et al. | 369/124 |
| 5,418,762 | 5/1995 | Kitayama | 369/54 |
| 5,440,529 | 8/1995 | Takezawa et al. | 369/47 |
| 5,442,608 | 8/1995 | Umeda et al. | 369/124 |
| 5,491,677 | 2/1996 | Sasaki | 369/60 |

FOREIGN PATENT DOCUMENTS

| | | |
|---|---|---|
| 3296927 | 12/1991 | Japan . |
| 5089469 | 4/1993 | Japan . |
| 2 258 372 | 2/1993 | United Kingdom . |

*Primary Examiner*—Nabil Hindi
*Attorney, Agent, or Firm*—Limbach & Limbach L.L.P.

[57] ABSTRACT

A reproducing apparatus for a disc-shaped recording medium having digital audio signals recorded in a compressed form includes an optical head, a spindle motor, a servo control unit, a decoder, a memory and a controller. The optical head radiates a light beam on the disc-shaped recording medium for reading out data recorded on the disc-shaped recording medium. The spindle motor rotationally drives the disc-shaped recording medium at a constant linear velocity. The servo control unit servo-controls the optical head and the spindle motor based upon error signals generated on the basis of output signal of the optical head. The decoder decodes output signals of the optical head. The memory transiently stores output data of the decoder and the data stored in the memory is read out at a readout rate slower than the write rate of the data outputted from the decoder. The controller controls the optical head and the memory so that, by alternately setting a first period during which data recorded on the disc-shaped recording medium is read out by the optical head and written in the memory and a second period during which readout of data recorded on the disc-shaped recording medium by the optical head is discontinued and only readout of the data stored in the memory is made, the data recorded on the disc-shaped recording medium is read out intermittently. The controller discontinues the operation of the servo control unit during the second period.

13 Claims, 2 Drawing Sheets

DISC REPRODUCING APPARATUS

This is a continuation of application Ser. No. 08/618,078 filed on Mar. 18, 1996, which is a continuation of application Ser. No. 08/261,346, filed Jun. 16, 1994 which is now abandoned.

BACKGROUND

1. Field of the Invention

The present invention relates to a reproducing apparatus for a disc-shaped recording medium. More particularly, the present invention relates to such reproducing apparatus in which data is intermittently read out from the disc-shaped recording medium.

2. Background of the Invention

The present Assignee has proposed a technique in which input digital audio signals are bit-compressed and recorded in a burst fashion with a pre-set data quantity as a recording unit.

This technique records/reproduces adaptive differential (AD) PCM digital audio data, as prescribed in an audio data format, such as a so-called CD-interactive (CD-I) or CD-ROM, or digital audio data in accordance with other formats, on or from a magneto-optical disc employed as a recording medium. The compressed digital audio data is recorded intermittently sector-continuously, with a preset amount of data as a recording unit, for example, at an interval of 32 sectors/minute, by appending linking sectors before and after each recording unit in order to take the interleaving with data of the neighboring sectors into account.

It is now assumed that data of the standard compact disc format (CD-DA format) or straight PCM audio data produced by simple linear quantization of analog audio signals are recorded or reproduced with bit compression to approximately one-fourth of the original data length.

The playback time of data recorded on the disc by compressing the bits to approximately one-fourth of the original data length is approximately four times of that when recording the straight PCM data before compression, for example, data of the CD-DA format. Since the recording/ playback time substantially equal to that for a standard CD with a diameter of 12 cm may be recorded on or reproduced from a disc of a smaller size, the reproducing apparatus may be correspondingly reduced in size. By setting the instantaneous bit rate for recording/reproduction so as to be equal to that of the standard CD-DA format, the actual time consumed in recording/reproduction may be reduced to one-fourth, as a result of which the residual time amounting to approximately three-fourths may be apportioned to retry or the like operations. These operations include verification operations as to if the recording has been made as normally or re-write operation if recording has not been made as normally, during data recording, and re-read operations in case of the high error rate of the playback data during data reproduction.

In addition, during the reproduction, by using special techniques in data readout from the disc, even under an adverse condition in which focusing or tracking servo becomes ineffective under vibrations of the mechanical parts due to disturbances, data reproduction may be carried out reliably.

For recording/reproducing digital audio data, which is bit-compressed to approximately one-fourth of the original data length, a buffer memory for recording and/or reproducing the compressed data is required. Compressed data is continuously recorded into this memory during recording at a constant rate, and the recorded data is read intermittently or in a burst fashion at a readout rate approximately four times of that for recording. The data quantity read out in each burst-like reading is the above-mentioned preset data quantity used as the recording unit, for example, 32 sectors. Before and after each unit of these 32 sectors, several linking sectors are appended and the resulting recording unit is recorded on the disc spatially continuously in continuation to the previously recorded recording unit.

During reproduction, the data of the pre-set recording unit, for example, data of 32 sectors and several linking sectors, are reproduced from the disc intermittently or in a burst fashion, at the above-mentioned rate equal to about four times of the recording rate, and are recorded in the buffer memory, without recording the fore and aft linking sectors. The compressed data is read out from the memory continuously at a preset readout rate.

If the total memory capacity of the recording and/or reproducing buffer memory is $M_T$, the sum of the data volume for which compressed data is as yet not recorded, that is the unread data volume, and the remaining storage capacity of the memory in which the data can be written without destructing the unread data, that is the writable capacity, is equal to $M_T$. The memory control as to data writing and readout for such memory is now explained.

During recording, compressed data is written in the buffer memory at a constant transfer rate. When the unread data volume exceeds a preset volume $M_K$, the data is read out in a burst fashion, with the above-mentioned recording unit of 32 plus several sectors, as a data readout unit, at a transfer rate faster than the transfer rate for writing. The data not recorded as yet on the recording medium is maintained on the memory as the unread data. If now the recording operation on the recording medium is interrupted due to disturbances, such as vibrations, or if the recording is otherwise not made in a regular manner, the volume of the unread data in the memory is not decreased, such that, if the volume of the unread data is close to the total storage capacity of the memory $M_T$, it may occur that the unread data be destroyed by the compressed data written at the preset rate. In this consideration, some allowance is afforded to the storage capacity of the writable region of the buffer memory in order to prevent the unread data from being destroyed in cases wherein the recording on the medium is interrupted or otherwise not made in a regular manner. The storage capacity in the memory ($M_T$-$M_K$) is set to such a value as will permit the compressed data to be continuously written in the memory at a constant data rate during a time interval which is assumed to be required for re-recording or resolution of the state of recording interruption on the recording medium.

During reproduction, control is made such that the compressed data read out in a burst fashion from the disc as the recording medium is written in the memory and read out therefrom at a constant data rate, and such that data is read out in a burst fashion and written in the memory when the volume of the unread data in the memory becomes smaller than the preset value $M_L$.

It is possible with the above-described apparatus that the residual unread data may be continuously read out even in cases wherein data readout from the disc cannot be made in a regular manner due to disturbances or the like, so that there is no risk of interruption of reproduction as a result of interruption of data readout at a constant rate. It suffices to set the volume of the unread data to a such value as will permit the operation of reading the compressed data to be read out from the memory at a preset rate during the time required in order to read the recording data again from the disc.

If a DRAM (Dynamic Random Access Memory) having a recording capacity of 1 Mbits is used as a semiconductor memory, the DRAM becomes replete with the digital signals in only 0.9 second during music reproduction. The digital signals corresponding to the total capacity of the DRAM corresponds to audio data continuing for about three seconds, in terms of the corresponding analog audio signals, such that, even if larger vibrations due to disturbances or the like are applied to the apparatus, digital signals may be continuously supplied from the DRAM to the expansion decoder and hence there is no risk of interruption of the playback signals. From the foregoing, it has become possible to reduce the reproducing apparatus employing the disc-shaped optical recording medium to a portable size.

In the portable size disc reproducing apparatus, constructed in accordance with the above-described technique, a battery is used as the power source. Since there is a limit in the service life of the battery, it is necessary to extend the service life of the battery so that the apparatus may be employed for as long a time interval as possible.

One of the factors leading to the shortening of the battery service life is the wasteful power consumption in the portion of the apparatus not required for reproduction. For possibly extending the battery service life, it suffices if the power consumption by the circuitry which is not required to be operated insofar as the disc reproducing operation remains unaffected.

With the above-described disc reproducing apparatus, the data readout time from the disc to the DRAM which is shorter than the playback time with the use of the expansion decoder suffices. However, when the data is not read out, the optical head is kept at a standstill in the so-called paused state at the head of the next data on the disc as the servo such as the tracking servo or the focusing servo remains effective with respect to the optical head. The result is that the power is wastefully consumed during this time interval by the servo circuit such as tracking and focusing servo circuit.

SUMMARY OF THE INVENTION

It is, therefore, a principal object of the present indention to provide a reproducing apparatus for a disc-shaped recording medium which resolves the above-mentioned problems.

According to the present invention, there is provided a reproducing apparatus including an optical head, a servo control unit, a memory and a controller. The optical head radiates a light beam on the disc-shaped recording medium for reading out data recorded on the disc-shaped recording medium. The servo control unit servo-controls the optical head and the spindle motor based upon error signals generated on the basis of output signals of the optical head. The memory transiently stores output data of a decoder and the data stored in the memory is read out at a readout rate slower than the write rate of the data outputted from the decoder. The controller controls the optical head and the memory so that, by alternately setting a first period during which data recorded on the disc-shaped recording medium is read out by the optical head and written in the memory and a second period during which readout of data recorded on the disc-shaped recording medium by the optical head is discontinued and only readout of the data stored in the memory is made, the data recorded on the disc-shaped recording medium is read out intermittently. The controller discontinues the operation of the servo means during the second period.

According to the present invention, there is also provided a reproducing apparatus for a disc-shaped recording medium including an optical head, a spindle motor, a servo control unit, a decoder, a memory and a controller. The optical head radiates a light beam on the disc-shaped recording medium for reading out data recorded on the disc-shaped recording medium. The spindle motor rotationally drives the disc-shaped recording medium at a constant linear velocity. The servo control unit servo-controls the optical head and the spindle motor based upon error signals generated on the basis of output signals of the optical head. The decoder decodes output signals of the optical head. The memory transiently stores output data of the decoder and the data stored in the memory is read out at a readout rate slower than the write rate of the data outputted from the decoder. The controller controls the optical head and the memory so that, by alternately setting a first period during which data recorded on the disc-shaped recording medium is read out by the optical head and written in the memory and a second period during which readout of data recorded on the disc-shaped recording medium by the optical head is discontinued and only readout of the data stored in the memory is made, the data recorded on the disc-shaped recording medium is read out intermittently. The controller discontinues the operation of the servo control unit during the second period.

According to the present invention, there is additionally provided a reproducing apparatus for a disc-shaped recording medium. The apparatus includes an optical head, a spindle motor, an error signal generating unit, a servo controller, a decoder, a memory and a controller. The optical head radiates a light beam on the disc-shaped recording medium for reading out data recorded on the disc-shaped recording medium. The spindle motor rotationally drives the disc-shaped recording medium at a constant linear velocity. The error signal generating unit generates focusing error signals, tracking error signals and signals for generating spindle servo signals based upon output signals of the optical head. The servo controller generates focusing servo signals, tracking servo signals and spindle servo signals based upon the focusing error signals, tracking error signals and the signals for generating the spindle servo signals, outputted by the error signal generating unit, respectively. The servo controller routes the focusing servo signals and the tracking servo signals to the optical head for effecting focusing servo and tracking servo. The servo controller also routes the spindle servo signals to the spindle motor for effecting spindle servo. The decoder decodes the output signals of the optical head. The memory transiently stores output data of the decoder. The data stored in the memory is read out at a readout rate slower than the write rate of the data outputted from the decoder. The controller controls the optical head and the memory so that, by alternately setting a first period during which data recorded on the disc-shaped recording medium is read out by the optical head and written in the memory and a second period during which readout of data recorded on the disc-shaped recording medium by the optical head is discontinued and only readout of the data stored in the memory is made, the data recorded on the disc-shaped recording medium is read out intermittently. The controller discontinues the operation of the servo controller during the second period.

According to the present invention, the first period during which data recorded on the disc-shaped recording medium is read out by the optical head and written in the memory and the second period during which readout of data recorded on the disc-shaped recording medium by the optical head is discontinued and only readout of the data stored in the memory is made are set alternately and data recorded on the disc-shaped recording medium is intermittently read out such that at least the servo control operation is discontinued during the second period for suppressing the wasteful power consumption and thereby extending the service life of the battery as the power source of the apparatus.

BRIEF DESCRIPTION OF THE DRAWINGS

The present invention will be more easily understood by the following description which is hereinafter made with reference to the accompanying drawings, wherein.

DESCRIPTION OF THE INVENTION

By referring to the drawings, the recording and/or reproducing apparatus for a recording medium according to the present invention will be explained in detail.

In the present embodiment, description is made of a portable recording and/or reproducing apparatus in which a magneto-optical disc is employed as a recording medium, and audio signals are recorded on or reproduced from the magneto-optical disc. The recording and/or reproducing apparatus is shown in a block diagram of FIG. 1.

Figure 1:
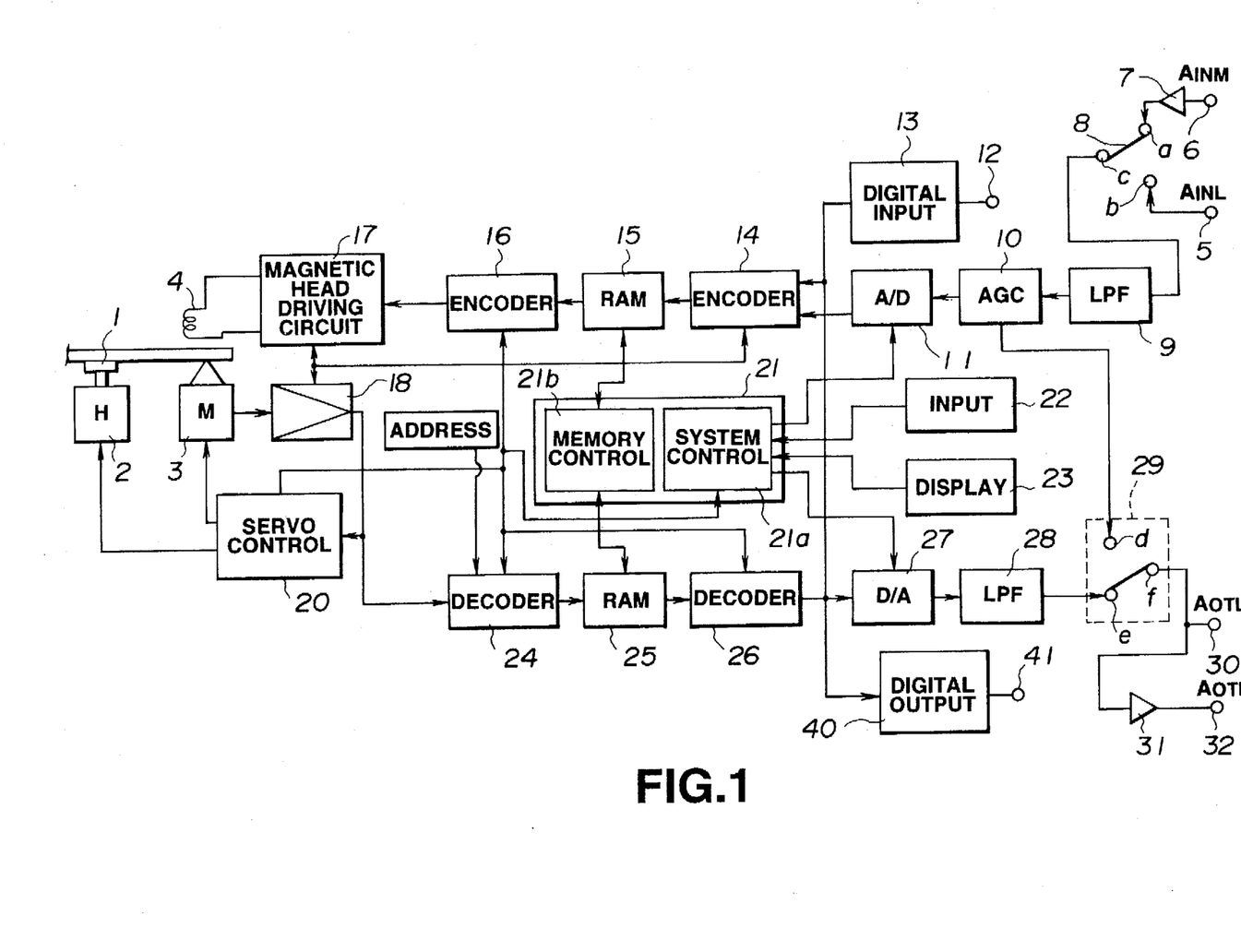
FIG. 1 is a block diagram showing a recording and/or reproducing apparatus according to an embodiment of the present invention.

A magneto-optical disc 1 as a recording medium includes a disc substrate, a recording layer and a protective film. The disc substrate is formed of a light-transmitting synthetic material, such as polycarbonate or PMMA. On the disc substrate, there is formed a spiral-shaped pre-groove which is wobbled radially of the disc in accordance with address data. The recording layer of a magnet-optical recording material, such as TbFeCo, is formed as a thin layer on the surface of the disc substrate carrying the pre-groove, such as by vacuum deposition or sputtering. The protective film of on UV curable resin is formed for protection purposes on the recording layer. The magneto-optical disc 1 has a data recording region and a table-of-contents(TOC) region carrying the table-of-contents(TOC) information recorded on the disc. In the data recording region, data are recorded discretely or continuously along the pre-groove. Recording and readout of data on or from the data recording region of the magneto-optical disc is made intermittently with one cluster of data as a unit. Each cluster is composed of 32 sectors in which data is actually recorded, and four linking sectors. Three of the four linking sectors are used for preventing data interference by CIRC interleaving between neighboring clusters. The remaining sector consecutive to the three sectors is reserved for subsidiary data. Each sector is constituted by plural sound groups, with 11 of such sound groups composed of paired two sectors. In the present embodiment, each sector comprises 2352 bytes, of which 2332 bytes are reserved for data. Each sound group is compsed of 424 bytes. Each sound group includes 512 samples of audio signals for right and left channels and corresponds to 11.61 msec in terms of the playback time. The information recorded in the TOC region includes the title information concerning the data recorded in the data region or the program information, address information, such as start addresses or end addresses, for the data or the program, and the information indicating the relation of interconnection of parts P as the small recording regions. After the magneto-optical disc 1 is loaded on the recording and/or reproducing apparatus, the TOC information is read by an optical pickup as later described, in advance of data recording or reproduction on or from the magneto-optical disc 1, and the data of the TOC information thus read out is stored in a storage region within a system controller as later explained or in a dedicated storage region provided in the buffer memory as later explained. The start address and the end address each are made up of 24 bit data, of which the 14 upper order bits denote a cluster number, the next following 6 bits denote sector number and the lower four bits denote the sound group number. The pre-groove formed on the magneto-optical disc 1 are wobbled radially of the disc based upon signals modulated in accordance with address data for pre-groove clusters and sectors. The system controller as later explained demodulates the pre-groove readout signals in order to confirm or manage the recording position or the playback position during the recording or playback operations.

The magneto-optical disc 1 is contained in a disc cartridge, not shown, having a pair of apertures on the upper and lower surfaces thereof for facing each other. The recording and/or reproducing operation for the magneto-optical disc 1 is performed via these apertures. The main member of the disc cartridge is provided with a shutter which is movable for opening or closing these apertures. The shutter is moved in the direction of opening the apertures by loading the disc cartridge on the recording and/or reproducing apparatus and is moved in the direction of closing the apertures when ejecting the disc cartridge from the recording and/or reproducing apparatus.

A spindle motor 2 rotationally drives the magneto-optical disc 1 at a constant linear velocity. The distal end of a rotational shaft of the spindle motor 2 carries a turntable, not shown. The magneto-optical disc 1 of the disc cartridge, loaded on the recording and/or reproducing apparatus, is set on this turntable.

An optical pickup 3, having an objective lens, includes an optical system, composed up of a laser light source, a beam splitter for separating a light beam outgoing from the light source from a reflected light beam reflected by the magneto-optical disc 1 and so forth and a photodetector for receiving the reflected light beam separated by the beam splitter. The objective lens converges the light beam emitted from the light source of the optical pickup 3 on the recording film via one of the apertures of the disc cartridge for the magneto-optical disc 1 and the disc substrate. The optical pickup 2 includes an actuator for driving the objective lens in both the focusing direction and the tracking direction. The actuator is supplied focusing servo signals and tracking servo signals from a servo control circuit as later explained. As a result, the objective lens is driven in both the focusing direction and the tracking direction for focusing and tracking operations until the focusing and tracking signals become equal to zero.

A magnetic head 4 faces the protective film side of the magneto-optical disc 1 via the other aperture of the disc cartridge. The magnetic head 4 is mounted for facing the optical pickup 3 with the magneto-optical disc 1 in-between. The magnetic head 4 generates a modulated vertical magnetic field corresponding to the recording data based upon driving signals supplied from a head driving circuit as later explained. The magnetic head 4 is mechanically connected to the optical pickup 3, so that, when the optical pickup 3 is moved radially of the magneto-optical disc 1, the magnetic head 4 is also moved radially of the magneto-optical disc 1.

The optical pickup 3 delivers a driving force to a feed mechanism, not shown, having a feed motor, also not shown, as a driving source, based upon feed signals supplied from a servo control circuit, as later explained, for feeding the optical pickup 3 radially of the magneto-optical disc 1.

An analog audio signal $A_{INL}$ from an audio equipment enters the apparatus via an input terminal 5, while an analog audio signal $A_{INM}$ from a microphone or the like enters the apparatus via an input terminal 6. The analog audio signal $A_{INM}$ entering the input terminal 6 is amplified by an amplifier 7 and supplied to an input fixed terminal a of a switch 8. The analog audio signal $A_{INL}$ from the input terminal 5 is supplied to an input fixed terminal b of the switch 8. The switch 8 has its movable contact c commutatively controlled by a system control unit of the controller as later explained for supplying the analog audio signal $A_{INL}$ or the analog audio signal $A_{INM}$ to a low-pass filter (LPF) 9.

The LPF 9 limits high frequency components of the input analog audio signal $A_{INL}$ or the analog audio signal $A_{INM}$. The analog signals, limited in bandwidths by the LPF 9, are routed to an automatic gain control (AGC) circuit 10 for gain adjustment in a known manner.

Output signals from the AGC circuit 10 are supplied to an input fixed terminal c of a switch as later explained and to an analog to digital (A/D) converter 11.

The A/D converter 11 converts analog audio signals, supplied from the AGC circuit 10, at a sampling frequency of 44.1 KHz and the number of quantizing bits equal to 16 bits.

The digital audio signals enter an input terminal 12 and are thence supplied via a digital interfacing circuit 13 to a compressor 14.

The compressor 14 is fed with digital signals outputted from the A/D converter 11 and with digital signals outputted from the interfacing circuit 13. The system control unit of the controller as later explained selects and decides which of the digital signals outputted from the A/D converter 11 and the digital signals outputted from the interfacing circuit 13 is to be supplied to the compressor 14. The digital audio signals supplied to the compressor 14 are compressed to about one-fifth of the original data volume. The compression technique employed in the compressor 14 is the modified discrete cosine transform (MDCT).

The digital data outputted from the compressor 14 is transiently stored in a buffer memory 15, while the digital data outputted from a decoder as later explained is transiently stored in a buffer memory 25. These buffer memories 15, 25 are controlled by a memory controller as later explained. As the buffer memory 15, a dynamic RAM (DRAM) having the storage capacity of 4 Mbits is employed.

The digital data read out from the memory 15 us routed to an EFM-CIRC encoder 16 which encodes the digital data supplied thereto with error detection and correction and modulates the encoded data. In the present embodiment, the digital data is modulated with eight-to-fourteen modulation (EFM). As the code for error detection and correction, the cross interleave Reed-Solomon code (CIRC) for the compact disc with the modified manner of interleaving is employed.

The recording data outputted from the encoder 16 is supplied to a head driving circuit 17 which generates driving signals for the magnetic head 4 based upon the recording data and routes the driving signals to the magnetic head 4.

An RF amplifier 18 is supplied with output signals of a photodetector of the optical pickup 3 and generates on RF signal as readout signals for the magneto-optical disc 1. Since the magneto-optical disc 1 is employed in the present embodiment as a recording medium, the RF signal are outputted by the RF amplifier 18 based upon the difference in the Kerr rotation angle of the light beam reflected by the recording layer of the magneto-optical disc 1. The RF signal is supplied to a decoder as later explained. The RF amplifier 18 generates a focusing error signal from the output signal of the photodetector in accordance with the so-called astigmatic method. The RF amplifier 18 generates a tracking error signal based upon the output signal of the photodetector in accordance with the so-called three-spot method. The RF amplifier 18 generates a push-pull signal, that is the signal detecting the meandering pre-groove, by the push-pull signal method, based upon the output signal of the photodetector, and transmits the generated push-pull signal to an address decoder 19. As for the astigmatic method and the three-spot method, reference is has to U.S. Pat. Nos. 4,023,033 and 3,909,608, respectively. The focusing error signal and the tracking error signal, generated by the RF amplifier 18, are routed to a servo control circuit as later explained. The RF amplifier 18 transmits the generated RF signal to the servo control circuit, as later explained, for generating spindle servo control signals.

The address decoder 19 is supplied with the push-pull signals generated by an RF amplifier 17, and frequency demodulates the push-pull signal supplied thereto in order to output address data. The address data outputted from the address decoder 18 is supplied to the decoder as later explained for decoding. The decoded address information is supplied to the system controller as later explained so as to be used therein for confirming and controlling the recording position or the playback position during the recording or the playback. The synchronization signal extracted from the address data decoded by the address decoder 19 are routed to the servo control circuit 20 as later explained for generating the spindle servo control signal.

The servo control circuit 20 is supplied with the focusing error signal, tracking error signal, RF signal and the spindle servo signal from the RF amplifier 18. The focusing servo signal and the tracking servo signal are supplied to the actuator of the optical pickup 3 for effecting the focusing servo and the tracking servo as explained previously. The spindle servo signal is generated based upon the RF signals or the synchronization signals extracted from the address data. The spindle servo signal is supplied to the spindle motor 2 for controlling the rotation of the spindle motor 2 in order to cause rotation of the spindle motor 2 at a constant linear velocity (CLV). The servo control circuit 20 generates feed signal based upon the low-frequency components of the tracking error signals. The feed signal is supplied to the feed motor of the feed mechanism, not shown. The feed motor is supplied a driving force to the feed mechanism, not shown, based upon the feed signal supplied thereto for feeding the optical pickup 3 and the magnetic head 4 radially of the magneto-optical disc 1 in a timed relation to the scanning of the recording track of the magneto-optical disc 1 by the light beam of the optical pickup 3. The servo control circuit 20 generates access signal based upon the access commands issued by the system control unit of the controller as later explained and routes the generated access signal to the feed motor. In such case, the access signal is routes to the feed motor to cause the optical pickup 3 and the magnetic head 4 to be moved a distance corresponding to the access commands in the radial direction of the magneto-optical disc 1 by the feed mechanism, not shown.

The system controller 21 is composed of a system control unit 21a and a memory control unit 21b. The system control unit 21a of the system controller 21 is connected to an input unit 22 and a display unit 23. The system control unit 21a generates various control signals for causing start and stop of the recording or reproducing operation and producing accessing operations based upon input signals from the input unit 22, and controls the operations of the servo control circuit 20, encoder 16 and the decoder of the recording and/or reproducing apparatus as later explained. An output level of the light beam outgoing from the optical pickup 3 is controlled by the control signal supplied from the system control unit 21a. The output level of the light beam outgoing from the optical pickup 3 during the recording operation is sufficient for recording and is immediately lowered to a level not permitting the recording, such as an output level for reproduction, when the occurrence of the track jump is recognized by the system control unit 21a.

The memory control unit 21b controls the data writing and readout for the memories 15, 25 as later explained. During recording on the magneto-optical disc 1, digital data outputted from the compressor 14 is written by the memory control unit 21b in the memory 15 at a transfer rate of 0.3 Mbits/second, and data stored in the memory 15 is read out therefrom at a transfer rate of 1.41 Mbits/second. During reproduction of the magneto-optical disc 1, digital data outputted from the decoder as later explained is written in the memory 25 at the transfer rate of 1.41 Mbits/second, and data stored in the memory 25 is read out from the memory 25 at the transfer rate of 0.3 Mbits/second.

If, during the recording operation, a track jump, that is the recording position on the magneto-optical disc 1 skipping to another recording position or to another track due to disturbances, such as vibrations, is not produced, the memory control unit 21b causes the compressed digital data outputted from the compressor 14 to be sequentially read from the memory 15 at the transfer rate which is approximately five times of the data recording rate into the memory 15. The digital data read out from the memory 15 is supplied to the encoder 16.

If a detection signal detecting the occurrence of track jump during the recording on the magneto-optical disc 1 is supplied to the system control unit 21a, the memory control unit 21b discontinues the transfer of the digital data to the encoder 16 and causes the compressed digital data from the compressor 14 to be stored in the memory 15. The memory control unit 21b then controls the data recording and readout on and from the memory 15 so that data transfer from the memory 15 to the encoder 16 is re-initiated after correcting the light beam radiating position on the magneto-optical disc 1, that is the recording position. The recording position is corrected based upon the address data on the magneto-optical disc 1.

Detection of track jump may be made by providing a vibration meter on the recording and/or reproducing apparatus and by the system control unit 21a making a discrimination of whether or not the vibration as detected by the vibration meter is such as will produce the track jump. On the other hand, since the address data is recorded as the pre-groove on the magneto-optical disc 1, the track jump may also be detected by reading out the address data during recording and monitoring the continuity of the decoded address data outputted by the address decoder as later explained. If the track jump is detected, the optical pickup 3 is controlled by the system control unit 21a so that the output level of the light beam radiated on the magneto-optical disc 1 by the optical pickup 3 is lowered to an unrecordable level, or so that the output level is reduced to zero.

In the above-mentioned case, it is required for the memories 15 and 25 to have the minimum storage capacity sufficient to store the amount of the digital data corresponding to the time period since the occurrence of the track jump until correction of the recording position is completed. In the present embodiment, the DRAMs having the storage capacity of 4 Mbits, satisfying the above conditions, are employed as the memories 15, 25.

As long as the normal recording operations are performed during recording, the memory control unit 21b controls the data recording in the memory 15 and data readout from the memory 15 so that the amount of the data stored in the memory 15 will be as small as possible. That is, if the data volume in the memory 15 exceeds a preset amount, a preset amount of data, such as one cluster, is read out from the memory 15 so that a recordable area is maintained in an amount in excess of a preset amount in the memory 15.

The input unit 22 is mounted on a front panel of the main member of the apparatus, and comprises plural actuating keys, such as a power source key for turning the power source of the apparatus on and off, a playback key for starting the playback operation, a recording key for starting the recording operation, a stop key for stopping the recording and playback operation, and an access key.

The display unit 23 is provided on a front panel of the main member of the apparatus and includes display elements, such as a liquid crystal display or phosphor display tube. The display unit 23 is fed with display control signals generated in the system control unit 21a based upon data recorded on the TOC region of the magneto-optical disc 1. The time information, such as the total playback time of the magneto-optical disc 1, elapsed playback time of the data or the program being reproduced, the residual time of the program or the data being reproduced or the residual recordable time, or the track number of the track being reproduced or recorded, are displayed on the display unit 23 based upon the display control signal. If the title of the disc itself, the title information of various data or the program, or data concerning the recording date of the data or the program, are recorded on the magneto-optical disc 1, these are selectively displayed on the display unit 23.

A decoder 24 processes the digital data from the RF amplifier 18 with demodulation and error correction which are the counterpart operations to the modulation and encoding performed by the encoder 16.

The output digital data of the decoder 24 is stored once in the buffer memory 25. The output digital data of the decoder 24 is recorded in the memory 25 at the transfer rate of 1.41 Mbits/second, while data stored in the memory 25 is read out therefrom at a transfer rate of 0.3 Mbits/second. The digital data read out from the memory 25 is fed to an expander 26.

The expander 26 expands the data, compressed by the compressor 4, by a factor of five. The digital signals expanded by the expander 26 is routed to a digital-to-analog (D/A) converter 27. The D/A converter 27 processes the output digital audio signals of the expander 26 with an operation which is the reverse of that performed by the A/D converter 11, and outputs the resulting data as an analog audio signal.

The output analog audio signals of the D/A converter 27 are routed via a LPF 28 to an input fixed contact e of a switch 29, the input fixed terminal of which is supplied the output signal of the AGC circuit 10, as mentioned hereinabove. The switch 29 has its movable contact f changed over by the system control unit 21a so that the analog audio signals via the LPF 28 and the output signal of the AGC circuit 10 are outputted selectively. The output analog audio signals of the switch 29 are routed via an output terminal 37 as line-out output signals to an external audio equipment or the like, while being amplified by an amplifier 31 and outputted at an output terminal 39 as a headphone output signal $A_{OTH}$.

The output digital audio signals of the decoder 24 are directly outputted, that is as digital signals, via a digital output interfacing circuit 40 at an output terminal 41. The interfacing circuit 40 is supplied the output digital signal of the digital input interfacing circuit 13. The digital signal supplied from the digital input interfacing circuit 13 is outputted at an output terminal 41 so as to be used as a recording monitoring signal.

The above-enumerated constituent elements are contained in a portable size cabinet along with mechanical components, such as a loading unit, and the power source. As the power source for the above-described recording and/or reproducing apparatus, primary batteries, such as dry cells, or the secondary batteries, are employed, and the dc voltage from these primary or secondary batteries is suitably boosted and supplied to the controller 21 and so forth.

The recording operation of the above-described recording and/or reproducing apparatus is now explained.

When a recording key of the input unit 22 is actuated, the system control unit 21a issues a control signal for starting the operations of the various components of the recording and/or reproducing apparatus. After the focusing servo and tracking servo operations are started, input signals at the input terminals 5 and 6, such as the analog audio signals, are routed via the LPF 9 and the AGC circuit 10 to the A/D converter 11 and thereby converted into 16-bit digital signals, that is digital audio signals. The digital audio signal are routed to the compressor 14 and thereby compressed to a data volume which is about one-fifth of the original data volume. The compressed signals are transiently stored in the memory 15. The digital data once stored in the memory 15 is read out by the memory control unit 21b and routed to the encoder 16. The digital data supplied to the encoder 16 are processed with EFM and error detection and correction and thereby converted into recording data. The recording data is routed via the head driving circuit 17 to the magnetic head 4 which forces a perpendicular magnetic field, modulated by a driving signal corresponding to the recording data, across the magneto-optical disc 1. At this time, a light beam having an output level necessary for recording is radiated from the disc substrate side of the magneto-optical disc 1. As a result, the recording layer of the magneto-optical disc 1 is heated by the light beam radiated from the optical pickup 3 to a temperature higher than the Curie temperature, while it is supplied with the modulated vertical magnetic field from the magnetic head 4. The temperature of the recording film is lowered from the Curie temperature as a result of relative movement between the light beam and the magneto-optical disc 1. The direction of magnetization of the recording layer is determined at this time by the direction of the vertical magnetic field applied by the magnetic head 4 to the magneto-optical disc 1 and data is accordingly recorded on the magneto-optical disc 1. In this manner, data corresponding to approximately two seconds (one cluster) of the original analog audio signal are recorded with approximately 0.4 second on the magneto-optical disc 1. The data is intermittently recorded with one cluster as a recording unit.

If the occurrence of the track jump caused by vibrations or the like has been detected by the system control unit 21a, the output level of the light beam outgoing from the optical pickup 3 is immediately lowered to an unrecordable output level, at the same time as the supply of the recording data to the magnetic head 4 or the readout of the digital data from the memory 15 is discontinued. The input signals entering the input terminals 5 and 6 are stored in the memory 15 until the operation of the output light beam of the optical pickup 3 again accessing the position prior to the occurrence of the track jump is terminated. On completion of the light beam accessing, the output level of the light beam outgoing from the optical pickup 3 is raised to that required for recording, at the same time as the supply of the recording data to the magnetic head 4 is again started to initiate the recording operation.

The system control unit 21a decides, based upon the input data at the input section 22 or the TOC data read out from the TOC region stored in the storage region within the system control unit 21a or the dedicated storage region in the memory 15 or 25, at which portion of the data recording region of the magneto-optical disc 1 the recording is started. During the recording operation, the data read out from the TOC region and held within the system control unit 21a or in the memories 15 and 25 are suitably modified depending on the recording operation. At the time point the recording operation of data corresponding to all of the input signals is terminated, or before the stop key of the input section 22 is actuated for ejecting the disc cartridge out of the recording and/or reproducing apparatus, the optical pickup 3 and the magnetic head 4 have access to the TOC region. The disc cartridge is ejected out of the recording and/or reproducing apparatus after the end of the updating operation of the data recorded in the table-of-contents region of the magneto-optical disc 1.

The basic reproducing operation of the recording and/or reproducing apparatus is now explained.

When the disc cartridge is loaded on the recording and/or reproducing apparatus, the starting operation for the spindle motor 2 and the capturing operation of the focusing servo and the tracking servo are performed, after which the optical pickup 3 is fed towards the inner rim of the magneto-optical disc 1 in order to read out the TOC region of the magneto-optical disc 1. The output level of the light beam radiated at this time by the optical pickup 3 on the magneto-optical disc 1 is set to such a level that data recording cannot be made, that is that the recording layer cannot be heated to the Curie temperature. The TOC data read out by the optical pickup 3 is stored in the storage region in the system controller 21a or in the dedicated storage region in the memories 15 or 25. The optical pickup 3 is then supplied towards the data recording region of the magneto-optical disc 1 in order to read out the data recorded in the data recording region. The system control unit 21a decides, based upon the input signals entering the input section 22, in which sequence and from which portion of the data recording region the data is to be read out. The output signals of the photodetector of the optical pickup 3 are routed to the RF amplifier 18 such that the focusing and tracking error signal as well as the RF signals are generated, as explained hereinabove. One of the focusing error signal, tracking error signal, RF signal and the synchronization signal extracted from the address data is supplied to the servo control circuit 20 where the focusing servo signal, tracking servo signal, spindle servo signal and the feed signal are generated.

The focusing servo and tracking servo operations are performed by the focusing servo signal and the tracking servo signal being supplied to the actuator of the optical pickup 3. The spindle servo operation is performed by the spindle servo signal being supplied to the spindle motor 2. The RF signal is supplied to the decoder 24 for EFM demodulation and error correction. The address data decoded by the address decoder 19 is routed via the decoder 24 to the system control unit 21a of the system controller 21. The system control unit 21a effectuates playback position control by the optical pickup 3 in the radial direction of the magneto-optical disc 1 based upon the supplied address information. Using the reproduced address information, the system control unit 21a manages the playback position on the recording track of the magneto-optical disc 1 traced by the optical pickup 3. Data readout from the magneto-optical disc 1 is performed intermittently with one cluster as a readout unit. The digital data outputted from the decoder 24 is transiently stored in the memory 25. Unless a track jump, that is an inadvertent movement of the playback position due to vibrations or the like, is occured during the playback operation, the memory control unit 21b causes the digital data to be written in the memory 25 at the transfer rate of 1.41 Mbits/second, while causing the digital data written in the memory 25 to be read out from the memory 25 at the transfer rate of 0.3 Mbits/second. The memory control unit 21b effectuates digital data write control for the memory 25 so that the volume of data stored in the memory 25 is not lowered to below a certain value. If the volume of data in the memory 25 is more than a preset value, data readout from the magneto-optical disc 1 is discontinued (paused state). If the system control unit 21a finds the occurrence of the track jump during the playback operation, the memory control unit 21b causes the writing of the output digital data of the decoder 24 into the memory 25 to be discontinued and causes only the transfer of the digital data to be effectuated from the memory 25 to the expander 26. During the period until the end of the playback position correcting operation, the digital data stored in the memory 25 is read out and decoded so as to be outputted at the output terminals 30, 32. Alternatively, the digital data stored in the memory 25 is outputted as digital signals at the output terminal 41.

The digital data read out from the memory 25 is routed to the expander 26 for data expansion. The output digital audio signals of the expander 26 are routed to the D/A converter 27 and thereby converted into the analog audio signal which is outputted at the output terminals 30 or 32 to an external audio equipment, such as an external amplifier or the like.

Whether the analog audio signal via the LPF 28 are outputted at the output terminal 30 or at the output terminal 32 is selected by the system control unit 21a setting the position of the movable contact f of the switch 29. The output signals of the AGC circuit 10 via the switch 29 are the audio monitor signal during recording, while the analog signal via the LPF 28 are a playback output signal. Whether the analog signal is outputted via the output terminals 30 or 32 or the digital signal is outputted via the output terminal 41 is similarly controlled by the system control unit 21a.

During the playback operation, the memory control unit 21b controls data writing into the memory 25 so that data in excess of the data volume corresponding to the necessary minimum time for the correction of the playback position is stored in the memory 25 during the normal playback operation. When the data volume in the memory 25 becomes lesser than a preset volume, the memory control unit 21b causes a control signal to be generated in the system control unit 21a to cause data to be intermittently read out by the optical pickup 3 from the magneto-optical disc 1 in order to write digital data from the decoder 24 in the memory 25. If a DRAM having the storage capacity of 1 Mbits is used, the time required in writing digital data fully in the memory 25 is approximately 0.9 second. The digital data having such time duration corresponds to the analog signals of approximately 3 seconds. That is, if, when the digital data is stored full in the memory 25, the output signal cease to be supplied from the optical pickup 3 which has read the magneto-optical disc 1, due to vibrations or the like, the analog signal and the digital signal as the playback signal continue to be outputted for approximately 3 seconds at the output terminals 30, 32 and at the output terminal 41, respectively. Since the DRAM having the storage capacity of 4 Mbits is employed in the present embodiment as the memory 25, the playback signal continue to be outputted at the output terminals 30 or 32 for approximately 12 seconds. By re-accessing the playback position on the disc by the optical pickup 3 during this time interval to a position prior to the occurrence of the track jump for re-initiating data readout from the magneto-optical disc 1, it becomes possible to prevent interruption of the analog audio signal outputted as playback signal at the output terminals 30 or 32 or the digital audio signal outputted at the output terminal 41.

After the end of the playback operation of all data recorded on the magneto-optical disc 1, or on actuation of the stop key of the input unit 22, the playback operation is discontinued and the disc cartridge expelled from the recording and/or reproducing apparatus.

Figure 2:
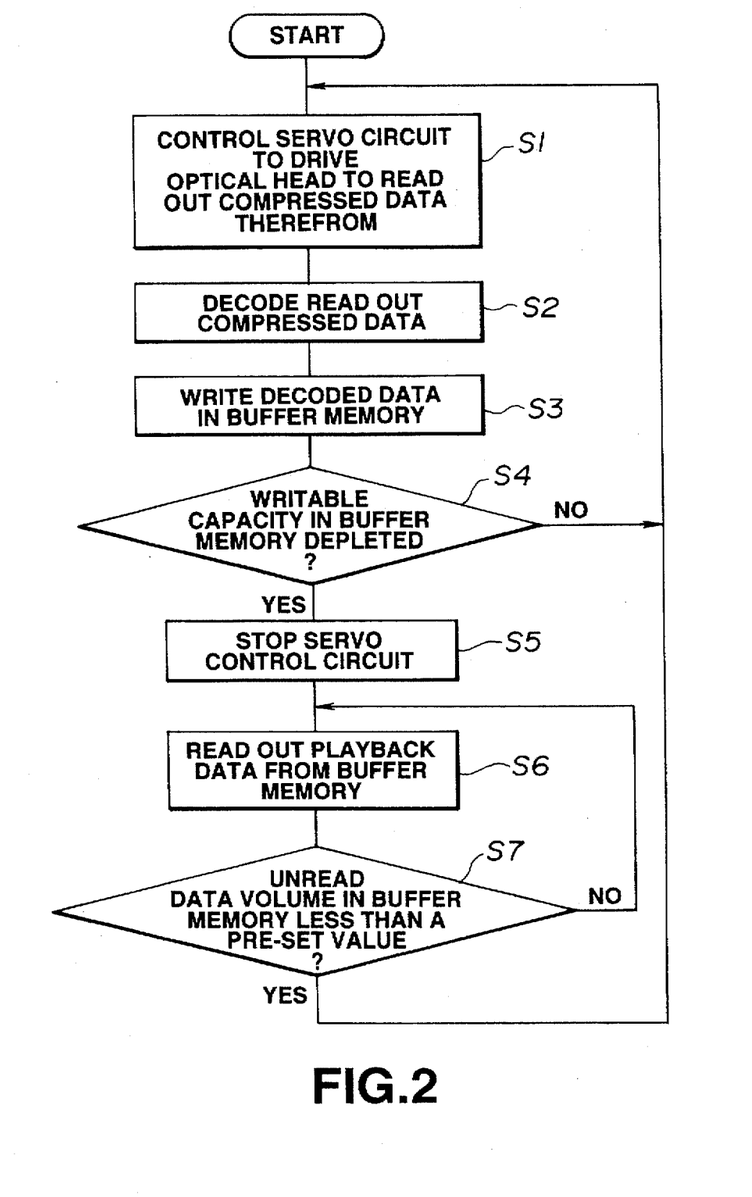
FIG. 2 is a flow chart for illustrating the control operation for the apparatus shown in FIG. 1.

The readout control by the system control unit 21a according to the present invention is now explained with reference to a flow chart of FIG. 2.

At a step S1, the system control unit 21a controls the servo control circuit 20 for shifting the optical pickup 3 along the radius of the magneto-optical disc 1 in order to read out data from the magneto-optical disc 1.

The system control unit 21a then causes the digital data decoded by the decoder 24 to be written in the memory 25. At a step S3, the system control unit 21a causes the digital data decoded by the decoder 24 to be written in the memory 25.

At a step S4, it is checked whether or not the digital data written in the memory 25 at the step S3 is written therein until there is left no writable region in the memory 25. This may be checked by the memory control unit 21b discriminating whether or not the write pointer for the memory 25 is coincident with the last address of the memory 25. If it is found at the step S4 that the digital data is written fully in the memory 25, the controller proceeds to a step S5. If the digital data is not written fully in the memory 25, the system control unit reverts to the step S1.

At a step S5, the system control unit 21a terminates the readout operation of the magneto-optical disc 1 by the optical pickup 1, while terminating the operation of the servo control circuit 20.

At a step S6, the system control unit 21a causes the readout of the digital data written from the memory 25 to be started. The read-out digital data is routed to the expander 26 and thereby expanded to a data length about five times of that of the compressed data. The expanded digital signal is converted by the D/A converter 27 into the analog signals which are outputted at the output terminals 30 or 32.

At a step S7, it is checked whether or not the data left in the memory 25 after data readout therefrom at the step S6, in other words, the data held in the memory 25, is lesser than a preset volume. Such checking may be achieved for example by the memory control unit 21b reading out the position of the read pointer of the memory 25. If it is found at the step S7 that the volume of data stored in the memory 25 is decreased to lower than the preset volume, the system control unit reverts to the step S1. If it is found that the data volume is not lower than the preset volume, the system control unit reverts to the step S6 to continue reading out the data from the memory 25. In case of reversion to the step S1, the servo control circuit 20 is again actuated, and subsequently the spindle motor 2 is run in rotation so that the magneto-optical disc 1 is rotated at the constant linear velocity, depending on the position of the optical pickup 3 on the magneto-optical disc 1 based upon the output signals of the optical pickup 3. After these start-up operations come to a close, the system control unit causes the readout operation by the optical pickup 3 of the magneto-optical disc 1 to be re-initiated before proceeding to the step S1.

Thus the system control unit 21a does not re-initiate the readout operation by the optical pickup 3 unless the volume of the data held within the memory 25 is the preset data volume. In other words, the servo control circuit 20 is maintained in its halted state, thus decreasing the power consumption in the servo control circuit 20.

The servo control circuit 20 takes charge of the tracking servo, focusing servo, spindle servo for the spindle motor 2 and sled servo of shifting the optical pickup 3 to a target track on the magneto-optical disc 1. In the present embodiment, it is possible for the system control unit 21a to limit the operations of the servo control circuit 20 until the data volume held by the memory 25 becomes equal to the preset data volume.

For example, the spindle motor 2 is controlled by the spindle servo system of the servo control circuit 20 so that the magneto-optical disc 1 is rotated at the constant linear velocity. However, the spindle motor 2 may also be controlled, by changing over the spindle servo system, so that the magneto-optical disc 1 is rotated at the constant angular velocity. For example, a preset driving signal is supplied to the spindle motor 2 so that the magneto-optical disc 1 is rotated at the constant angular velocity. Simultaneously, the tracking servo system of the servo control circuit 20 is turned off in order to turn the tracking servo of the optical pickup 3 off. The focusing servo system of the servo control circuit 20 routes a driving signal not rendering the focusing servo of the optical pickup 3 ineffective to the actuator of the optical pickup 3 in order to effectuate the focusing servo.

In addition to terminating the operation of the servo control circuit 20, the system control unit 21a causes the output level of the light beam outgoing from the optical pickup 3 to be decreased to a level of barely detecting the focusing error signals and barely effectuating the focusing servo by the focusing servo system of the servo control circuit 20. The reason the focusing servo is operated at the minimum operable conditions is to permit the prompt re-initiation of the readout operation by the optical pickup 3. If the focusing servo system is turned off, it takes time until re-initiation of the readout operation by the optical pickup 3. However, the focusing servo system of the servo control circuit 20 may also be turned off if so desired. Since the decoder 24 need not be actuated during the time data is read out from the memory 25, the system controller 21a terminates the supply of clocks to the decoder 24.

In the embodiment, the system control unit 21a controls the circuit or the units of the disc recording and/or reproducing apparatus in order following steps. In the first place, the system control unit 21a turns off the tracking servo and the spindle servo of the servo circuit 20. Next, the system control unit 21a controls the servo circuit 20 to reduce the gain of the focus servo, the output level of the light beam emitted from the optical pickup 3 to become lower output level and the decoder 24 to turn off.

If the servo control circuit 20 is turned off in this manner, power consumption may be diminished significantly. This may partially be ascribable to the fact that an electromagnetic actuator is employed as the actuator for the optical pickup 3 which is controlled by the servo signals from the servo control circuit 20. The result is that the service life of the primary battery or the secondary battery as the power source may be extended to permit the apparatus to be employed for a longer time duration.

Although the foregoing description has been made in connection with the use of the recording memory 15 and the playback memory 25, only a sole memory may be employed as the recording operation and the reproducing operation is usually not performed simultaneously.

In addition, although the foregoing description has been made in connection with a portable recording and/or reproducing apparatus employing the primary battery or the rechargeable battery as the power source, the recording and/or reproducing apparatus may also employ a single phase 100 V power source, in which case not only the power consumption may be diminished but the heat evolution within the apparatus may be lowered and the magneto-optical disc 1 may be protected against ill thermal effects. Other modifications may also be envisaged without substantially departing from the purport of the present invention.

What is claimed is:

1. A reproducing apparatus for a disc-shaped recording medium, comprising:

an optical head for radiating a light beam on the disc-shaped recording medium for reading out data recorded thereon;

servo means for effectuating servo control of said optical head based upon error signals generated based upon output signals of said optical head;

a memory in which the data read out from the disc-shaped recording medium by said optical head is transiently stored and from which the data stored therein is read out at a readout rate slower than the write rate of the data read out from the disc-shaped recording medium by said optical head; and control means for controlling said optical head and said memory so that, by alternately setting a first period during which data recorded on the disc-shaped recording medium is read out by said optical head and written in said memory and a second period during which readout of data recorded on the disc-shaped recording medium by the optical head is discontinued and only readout of the data stored in the memory is made, the data recorded on the disc-shaped recording medium is read out intermittently, said control means discontinuing the operation of said servo means and reducing the output level of the light beam from said optical head to a lower level during said second period.

2. A reproducing apparatus according to claim 1, wherein said control means comprises a memory control section for controlling writing in said memory of data read out from said optical head and readout of data stored in said memory, said control means issuing a control signal for re-initiating the readout operation of said optical head and the servo operation of said servo means when said memory control section detects that the volume of data stored in said memory has become lesser than a preset volume.

3. A reproducing apparatus according to claim 1, wherein said apparatus further comprises rotational driving means for rotationally driving said disc-shaped recording medium at a constant linear velocity, said control means controlling said rotational driving means so that said disc-shaped recording medium is rotated at a constant angular velocity during said second period.

4. A reproducing apparatus for a disc-shaped recording medium having digital audio signals recorded thereon in a compressed form, said apparatus comprising:

an optical head for radiating a light beam on the disc-shaped recording medium for reading out data recorded thereon;

a spindle motor for rotationally driving the disc-shaped recording medium at a constant linear velocity;

servo means for effectuating servo control of said optical head and the spindle motor based upon error signals generated based upon output signals of said optical head;

decoding means for decoding the output signals of said optical head;

a memory in which output data of said decoding means is transiently stored and from which the data stored therein is read out at a readout rate slower than the write rate of the data outputted from said decoding means; and control means for controlling said optical head and said memory so that, by alternately setting a first period during which data recorded on the disc-shaped recording medium is read out by said optical head and written in said memory and a second period during which readout of data recorded on the disc-shaped recording medium by the optical head is discontinued and only readout of the data stored in said memory is made, the data recorded on the disc-shaped recording medium is read out intermittently, said control means discontinuing the operation of said servo means and reducing the output level of the light beam from said optical head to a lower level during the second period.

5. A reproducing apparatus according to claim 4, wherein said control means comprises a memory control section for controlling writing in said memory of data read out from said optical head and readout of data stored in said memory, said control means issuing a control signal for re-initiating the readout operation of said optical head and the servo operation of said servo means when said memory control section detects that the volume of data stored in said memory has become lesser than a preset volume.

6. A reproducing apparatus according to claim 4, wherein said control means controls said rotational driving means so that the disc-shaped recording medium is rotated at a constant angular velocity during said second period.

7. A reproducing apparatus according to claim 4, wherein said control means discontinues the supply of clock signals to said decoding means during said second period.

8. A reproducing apparatus according to claim 4, wherein said control means controls said optical head so that the optical head is in the paused state during said second period.

9. A reproducing apparatus according to claim 4, wherein said control means comprises an optical source for radiating a light beam on the disc-shaped recording medium, said control means causing the output level of the light beam radiated on the disc-shaped recording medium during said second period to a level only necessary for the servo control by said servo means.

10. A reproducing apparatus for a disc-shaped recording medium having digital audio signals recorded thereon in a compressed form, said apparatus comprising:

an optical head for radiating a light beam on the disc-shaped recording medium for reading out data recorded thereon;

a spindle motor for rotationally driving the disc-shaped recording medium at a constant linear velocity;

error signal generating means for generating focusing error signals, tracking error signals and signals for generating spindle servo signals based upon output signals of said optical head;

servo means for generating focusing servo signals, tracking servo signals and spindle servo signals based upon the focusing error signals, the tracking error signals and the signals for generating the spindle servo signals, outputted by said error signal generating means, respectively, said servo means routing the focusing servo signals and the tracking servo signals to said optical head for effecting focusing servo and tracking servo, said servo means also routing the spindle servo signals to said spindle motor for effecting spindle servo;

decoding means for decoding the output signals of said optical head;

a memory in which output data of said decoding means is transiently stored and from which the data stored therein is read out at a readout rate slower than the write rate of the data outputted from said decoding means; and control means for controlling said optical head and said memory so that, by alternately setting a first period during which data recorded on the disc-shaped recording medium is read out by said optical head and written in said memory and a second period during which readout of data recorded on the disc-shaped recording medium by the optical head is discontinued and only readout of the data stored in said memory is made, the data recorded on the disc-shaped recording medium is read out intermittently, said control means discontinuing the operation of said servo means and reducing the output level of the light beam from said optical head to a lower level during the second period.

11. A reproducing apparatus according to claim 10, wherein during the second period said control means disengages the tracking servo and the spindle servo, controls said servo means to reduce the gain of the focus servo, reduces the output level of the light beam from said optical head such that the focusing error signals are minimally detectable by said optical head, and effects the focusing servo to a minimum operable condition, and terminates decoding operation by said decoding means after said memory has reached its capacity with the readout data from the disc-shaped recording medium.

12. The reproducing apparatus according to claim 1 wherein the control means reduces the output level of the light beam from the optical head such that the error signals are minimally detectable by the optical head.

13. The reproducing apparatus according to claim 4 wherein the control means reduces the output level of the light beam from the optical head such that the error signals are minimally detectable by the optical head.

* * * * *